(12) United States Patent
Chen et al.

(10) Patent No.: US 10,894,288 B2
(45) Date of Patent: Jan. 19, 2021

(54) SURFACE-TREATED CERAMIC POWDER AND APPLICATIONS THEREOF

(71) Applicant: INDUSTRIAL TECHNOLOGY RESEARCH INSTITUTE, Hsinchu (TW)

(72) Inventors: Tai-Sheng Chen, Kaohsiung (TW); Ming-Sheng Leu, Zhudong Township (TW); Hong-Jen Lai, Hsinchu (TW); Wu-Han Liu, Miaoli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 220 days.

(21) Appl. No.: 15/394,109

(22) Filed: Dec. 29, 2016

(65) Prior Publication Data
US 2018/0161870 A1   Jun. 14, 2018

(30) Foreign Application Priority Data
Dec. 9, 2016   (TW) ............... 105140857 A

(51) Int. Cl.
   *B22F 1/02*       (2006.01)
   *C04B 35/628*    (2006.01)
   (Continued)

(52) U.S. Cl.
   CPC ........ *B22F 1/025* (2013.01); *C04B 35/62813* (2013.01); *C04B 35/62821* (2013.01);
   (Continued)

(58) Field of Classification Search
   CPC .......... B22F 1/025; B22F 9/04; B22F 1/0003; B22F 2302/25; B22F 2302/253;
   (Continued)

(56) References Cited

U.S. PATENT DOCUMENTS 5,307,127 A   4/1994   Kobayashi et al.
5,945,471 A   8/1999   Morita et al.
(Continued)

FOREIGN PATENT DOCUMENTS

CN   1472173 A    2/2004
CN   103160148 A  6/2013
(Continued)

OTHER PUBLICATIONS

Gai et al., "Particle shape modification and related property improvements." Powder Technology vol. 183, Issue 1, 2008 (available online Nov. 24, 2007), pp. 115-121.
(Continued)

*Primary Examiner* — Anthony J Zimmer
*Assistant Examiner* — Anthony M Liang
(74) *Attorney, Agent, or Firm* — Birch, Stewart, Kolasch & Birch, LLP

(57) ABSTRACT

A surface-treated ceramic powder includes a plurality of ceramic particles and a surface-treating material. Each of the ceramic particles is at least partially coated by the surface-treating material, wherein the ceramic particles have an average particle diameter ranging from 10 micrometer (μm) to 100 μm, and the surface-treating material is made of metal, metal oxide or the combination thereof.

7 Claims, 6 Drawing Sheets

(51) Int. Cl.
*C23C 18/16* (2006.01)
*C23C 18/31* (2006.01)
*C22C 1/05* (2006.01)
C22C 32/00 (2006.01)
C23C 18/18 (2006.01)
C23C 18/36 (2006.01)

(52) U.S. Cl.
CPC .. *C04B 35/62823* (2013.01); *C04B 35/62842* (2013.01); *C04B 35/62889* (2013.01); *C04B 35/62892* (2013.01); *C04B 35/62897* (2013.01); *C22C 1/05* (2013.01); *C23C 18/1633* (2013.01); *C23C 18/31* (2013.01); C04B 2235/3212 (2013.01); C04B 2235/3217 (2013.01); C04B 2235/3232 (2013.01); C04B 2235/3244 (2013.01); C04B 2235/3418 (2013.01); C04B 2235/5436 (2013.01); *C22C 32/001* (2013.01); *C23C 18/1635* (2013.01); *C23C 18/1889* (2013.01); *C23C 18/36* (2013.01)

(58) Field of Classification Search
CPC ......... B22F 2302/256; C04B 35/62813; C04B 35/62821; C04B 35/62842; C04B 35/62889; C04B 35/62892; C04B 35/62897; C23C 18/1633; C23C 18/1635; C23C 18/1889; C23C 18/31; C23C 18/36; C22C 1/05; C22C 1/051; C22C 32/001
See application file for complete search history.

(56) References Cited

U.S. PATENT DOCUMENTS

| | | | |
|---|---|---|---|
| 5,998,336 A * | 12/1999 | Holcomb | H01L 39/12 174/125.1 |
| 6,235,076 B1 | 5/2001 | Ozaki et al. | |
| 6,908,675 B1 | 6/2005 | Bohach et al. | |
| 7,084,370 B2 | 8/2006 | Hagemeister et al. | |
| 7,425,287 B2 | 9/2008 | Kogoi et al. | |
| 8,052,743 B2 | 11/2011 | Weber et al. | |
| 8,062,670 B2 | 11/2011 | Baran, Jr. et al. | |
| 8,319,151 B2 | 11/2012 | Chua et al. | |
| 8,545,572 B2 | 10/2013 | Olson | |
| 8,894,739 B1 | 11/2014 | Johnson et al. | |
| 2006/0251535 A1 * | 11/2006 | Pfeifer | B22F 3/1055 419/36 |
| 2007/0065779 A1 | 3/2007 | Mangano | |
| 2007/0197396 A1 * | 8/2007 | Holcomb | H01L 39/141 505/400 |
| 2008/0008894 A1 * | 1/2008 | Abdo | C04B 35/01 428/469 |
| 2008/0145332 A1 | 6/2008 | Ogawa et al. | |
| 2011/0033552 A1 | 2/2011 | Shoji | |
| 2015/0011673 A1 | 1/2015 | Yamagawa et al. | |
| 2016/0128843 A1 | 5/2016 | Tsau et al. | |
| 2016/0153081 A1 | 6/2016 | Lai et al. | |
| 2017/0175260 A1 | 6/2017 | Hsiao et al. | |
| 2019/0003019 A1 * | 1/2019 | Ibe | B28B 1/00 |

FOREIGN PATENT DOCUMENTS

| | | |
|---|---|---|
| CN | 104150912 A | 11/2014 |
| CN | 104797531 A | 7/2015 |
| CN | 105583401 A | 5/2016 |
| CN | 105837197 A | 8/2016 |
| EP | 1 800 700 A2 | 6/2007 |
| JP | 4-270171 A | 9/1992 |
| JP | 2011-178643 A | 9/2011 |
| TW | 200515945 A | 5/2005 |
| TW | 200531082 A | 9/2005 |
| TW | 200702066 A | 1/2007 |
| TW | 200806408 A | 2/2008 |
| TW | 201113047 A | 4/2011 |
| TW | 201221209 A | 6/2012 |
| TW | 201424887 A | 7/2014 |
| TW | I478765 B | 4/2015 |
| TW | I488974 B | 6/2015 |
| TW | 201524590 A | 7/2015 |
| TW | 201536874 A | 10/2015 |
| TW | I501807 B | 10/2015 |
| TW | I509866 B | 11/2015 |
| TW | I513673 B | 12/2015 |
| TW | I520990 B | 2/2016 |
| TW | I522238 B | 2/2016 |
| TW | I533925 B | 5/2016 |
| TW | 201618854 A | 6/2016 |

OTHER PUBLICATIONS

Guo et al., "The Material properties characterization of SiC powder surface-modified by polyethylene glycol," Journal of Materials Engineering, Mar. 2004, pp. 7-10, with an English abstract.

Iijima et al., "Surface Modification for Improving the Stability of Nanoparticles in Liquid Media," KONA Powder and Particle Journal, No. 27, 2009, pp. 119-129.

Kawabata et al., "Fluidity of a Slurry of the Graphite Powder Coated with $Al_2O_3$-Based Metal Oxides," Journal of Materials Science Letters, vol. 20, No. 9, 2001, pp. 851-853.

Lee et al., "Hydroxyapatite-$TiO_2$ Hybrid Coating on Ti Implants," Journal of Biomaterials Applications, vol. 20, Issue 3, Jan. 2006, pp. 195-208.

Shi et al., "Study on the preparation of chitosan-alginate complex membrane and the effects on adhesion and activation of endothelial cells," Applied Surface Science, vol. 255, Issue 2, 2008 (available online Jul. 1, 2008), pp. 422-425.

Wang et al., "In situ fabrication of bioceramic composite coatings by laser cladding," Surface & Coatings Technology, vol. 200, Issue 7, 2005 (available online Aug. 31, 2005), pp. 2080-2084.

Wang et al., "Systematic Approach for Dispersion of Silicon Nitride Powder in Organic Media: II, Dispersion of the Powder," J. Am. Ceram. Soc., vol. 83, No. 4, Apr. 2000, pp. 697-702.

Chinese Office Action for Application No. 201611216991.2, dated Mar. 4, 2020.

* cited by examiner

SURFACE-TREATED CERAMIC POWDER AND APPLICATIONS THEREOF

CROSS REFERENCE TO RELATED APPLICATIONS

This application claims the benefit of Taiwan application Serial No. 105140857, filed, Dec. 9, 2016, the subject matter of which is incorporated herein by reference.

TECHNICAL FIELD

The technical field relates to a ceramic powder and a ceramic powder having a plurality of particles subjected to a surface-treatment and applications thereof.

BACKGROUND

Additive manufacturing (AM) is a technology of building a three dimensional (3D) object by adding layer-upon-layer of sintering material using a high powered laser focused on small particles of the sintering material that usually includes metal particles. The selective laser sintering (SLM) process repeats until the build or model of the 3D object is completed. Currently, AM technology has been widely applied in vehicle, air plan, molding industry, medical device, jewelry, art and consumer goods due to its various advantages of mass customization, high manufacturing speed, flexible process and high price-performance ratio.

Sintering material for AM technology is commonly available in powder form and requires high flowability. For example, in order to secure the quality of the 3D object, the powder flow rate of the sintering material which includes metal particles should be maintained less than 60 second (s)/50 grams (g) to make a new layer of powder uniformly swept and distributed over the prior layer during the laser sintering process. However, the sintering material may further includes some other nonmetal particles, such as ceramic particles, in various applications, and the powder flowability of the sintering material may be reduced significantly due to the interaction of the metal/nonmetal particles. As a result, the sintering material powder cannot be uniformly swept and distributed over the platform on which the laser sintering process is performed during the build cycle of the 3D object, and the manufacturing quality of the 3D object may be deteriorated indirectly.

Accordingly, an innovative surface-treated ceramic powder and a composite powder is called for.

SUMMARY

One embodiment of the present disclosure, a surface-treated ceramic powder is provided, wherein the surface-treated ceramic powder includes a plurality of ceramic particles and a surface-treating material. Each of the ceramic particles is at least partially coated by the surface-treating material, wherein the ceramic particles have an average particle diameter ranging from 1 micrometer ($\mu$m) to 100 $\mu$m, and the surface-treating material is made of metal, metal oxide or the combination thereof.

Another embodiment of the present disclosure, a metal/ceramic composite powder is provided, wherein the metal/ceramic composite powder includes the surface-treated ceramic powder aforementioned and a plurality of metal particles. The metal/ceramic composite powder includes about 1% to 10% of the surface-treated ceramic powder and about 90% to 99% of the metal particles by weight. The metal particles have an average particle diameter ranging from 10 $\mu$m to 100 $\mu$m.

An alternative embodiment of the present disclosure, a method for fabricating a metal/ceramic composite powder is provided, wherein the method includes steps as follows: A plurality of ceramic particles are firstly provided. A surface-treatment is then performed to make each of the ceramic particles is at least partially coated by a surface-treating material made of metal, metal oxide or the combination thereof. Subsequently, the surface-treated ceramic particles are mixed with a plurality of metal particles.

In accordance with the embodiments of the present disclosure, a surface-treated ceramic powder, a metal/ceramic composite powder including the surface-treated ceramic powder and the method for fabricating the same are provided. A plurality ceramic particles are subjected to a surface-treatment to form the surface-treated ceramic powder, by which a surface-treating material made of metal, metal oxide or the combination thereof is at least partially coated on each of the ceramic particles. The surface-treated ceramic powder is then mixed with a plurality of metal particles to form the metal/ceramic composite powder, whereby the flowability of the metal/ceramic composite powder can be improved.

In some embodiments of the present disclosure, the metal/ceramic composite powder including the surface-treated ceramic powder may have a powder flow rate ranging from 30 s/50 g to 60 s/50 g and can be uniformly swept and distributed over a platform on which a laser sintering process is performed during a build cycle of the AM.

The present disclosure will become better understood with regard to the following detailed description of the preferred but non-limiting embodiment(s). The following description is made with reference to the accompanying drawings.

DETAILED DESCRIPTION

Figure 1A:
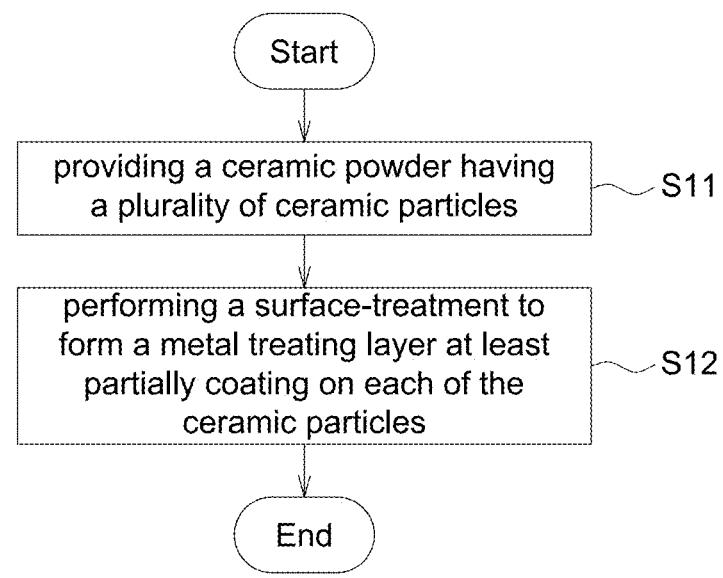
FIG. 1A is a process flow diagram illustrating the method for forming a surface-treated ceramic powder according to one embodiment of the present disclosure.

According to the present disclosure, a surface-treated ceramic powder and a composite powder including the surface-treated ceramic powder are provided to increase the flowability of the composite powder. A number of embodiments of the present disclosure are disclosed below with reference to accompanying drawings.

However, the structure and content disclosed in the embodiments are for exemplary and explanatory purposes only, and the scope of protection of the present disclosure is not limited to the embodiments. Designations common to the accompanying drawings and embodiments are used to indicate identical or similar elements. It should be noted that the present disclosure does not illustrate all possible embodiments, and anyone skilled in the technology field of the invention will be able to make suitable modifications or changes based on the specification disclosed below to meet actual needs without breaching the spirit of the invention. The present disclosure is applicable to other implementations not disclosed in the specification. In addition, the drawings are simplified such that the content of the embodiments can be clearly described, and the shapes, sizes and scales of elements are schematically shown in the drawings for explanatory and exemplary purposes only, not for limiting the scope of protection of the present disclosure.

Figure 1B:
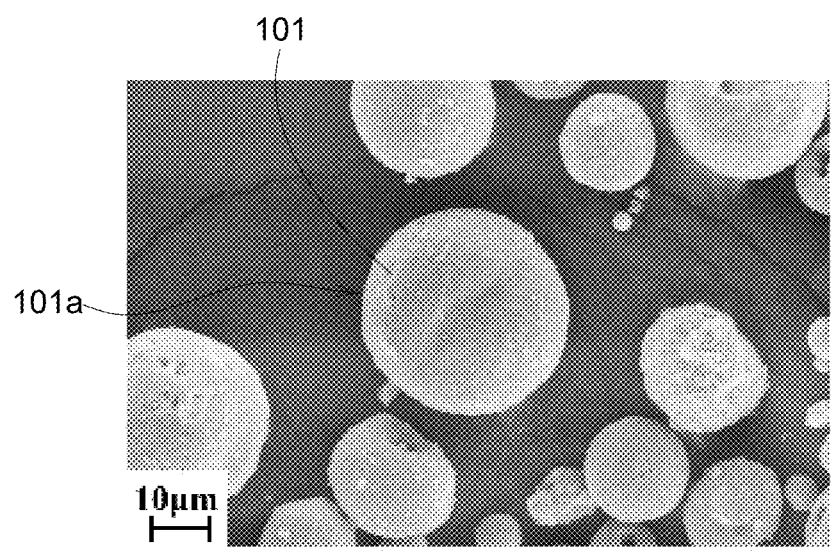
FIG. 1B is a scanning electron microscope (SEM) image illustrating a plurality of ceramic particles prepared by the step S11 of FIG. 1A.
Figure 1C:
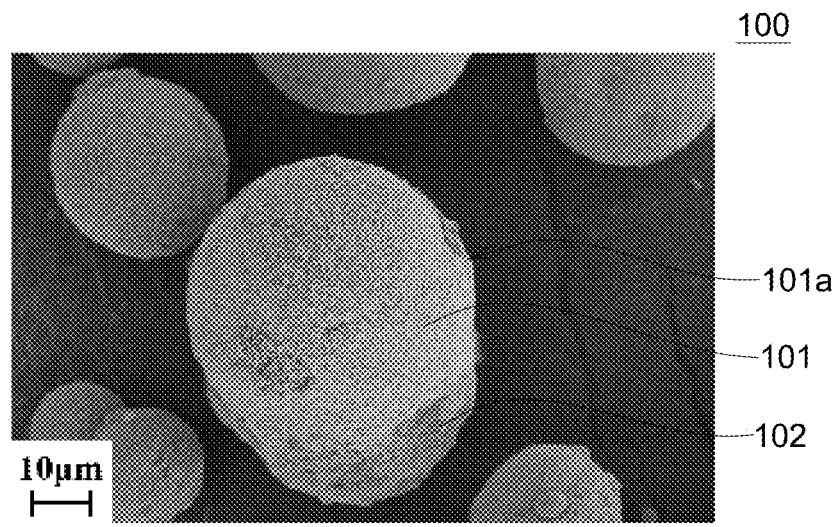
FIG. 1C is a SEM image illustrating a surface-treated ceramic powder formed by the method as set forth in FIG. 1A.
Figure 1D:
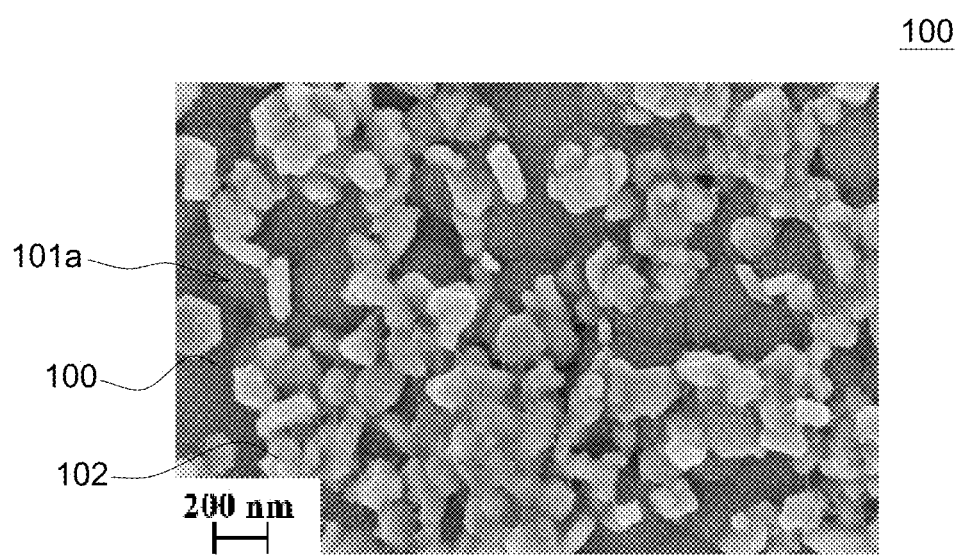
FIG. 1D is a partial enlarged view of the SEM image in FIG. 1C.

FIG. 1A is a process flow diagram illustrating the method for forming a surface-treated ceramic powder 100 according to one embodiment of the present disclosure. FIG. 1B is a SEM image illustrating a plurality of ceramic particles 101 prepared by the step S11 of FIG. 1A. FIG. 1C is a SEM image illustrating a surface-treated ceramic powder formed by the method as set forth in FIG. 1A. FIG. 1D is a partial enlarged view of the SEM image depicted in FIG. 1C.

The method for forming the surface-treated ceramic powder 100 includes steps as follows: According to the step S11 of FIG. 1A, a plurality of ceramic particles 101 are firstly provided (see FIG. 1B). In some embodiments of present disclosure, the ceramic particles 101 may include a ceramic material, such as (but not limited to) hydroxyapatite (HA), calcium phosphate ($Ca_3(PO_4)_2$), bioactive glass (Si—Ca—Na—P—O), titanium oxide ($TiO_2$), zirconium oxide ($ZrO_2$), silicon dioxide ($SiO_2$), aluminum oxide ($Al_2O_3$) or the arbitrary combinations thereof. The ceramic particles 101 have an average particle diameter ranging from 1 μm to 100 μm. In the present embodiment, the ceramic particles 101 can be made of HA and have an average particle diameter ranging from 20 μm to 60 μm.

Next, a surface-treatment is performed to make each of the ceramic particles 101 thoroughly encapsulated or partially coated by a surface-treating material, so as to form the ceramic particles 100 as shown in FIG. 1C. In the preset embodiment, the surface-treatment can be a metal deposition process, such as (but not limited to) a physical vapor deposition (PVD) process, a chemical vapor deposition (CVD) process, an electrolytic deposition process, an electroless plating process or a Sol-gel process, by which a metal treating layer 102 can be formed on a surface 101a of each of the ceramic particles 101 (see the step S12). The metal treating layer 102 includes a metal material selected from a group consisting of iron (Fe), cobalt (Co), titanium (Ti), tantalum (Ta), palladium (Pd), silver (Ag), gold (Au) and the arbitrary combinations thereof.

In the present embodiment, the metal treating layer 102 is a patterned or non-patterned layer formed by an electroless plating process which also referred to as a chemical plating process or an autocatalytic plating process. During the electroless plating process, metal ions solved in solvent are precipitated on the surface of the object to be plated by reduction. The electroless plating process includes steps of (1) tin(II) chloride ($SnCl_2$) and hydrochloric acid (HCl) sensitization, (2) washing and filtration, (3) palladium(II) chloride ($PdCl_2$) and HCl activation, (4) washing, filtration and drying (100° C. for 6-8 hours) (5) electroless plating ($CoSO_4$+$NaPO_2H_2$+$Na_3C_6H_5O_7$+$NH_4Cl$; PH=8~9, Temperature=90° C., time=10~30 minutes). The thickness of the metal treating layer 102 can be controlled by the tuning the plating time of the electroless plating step.

In some embodiments of the present disclosure, the metal treating layer 102 may include metal oxide, and the thickness of the metal treating layer 102 may range from 10 nanometer (nm) to 100 nm. The metal treating layer 102 can have a sheet resistance ranging from $10^4$ ohms per square (Ω/S) to $10^{11}$ Ω/S. Each of the ceramic particles 101 can be thoroughly encapsulated by the metal treating layer 102; or the surface 101a of each ceramic particles 101 may be just partially coated by the metal treating layer 102. In some embodiments, the metal treating layer 102 disposed on each of the ceramic particles 101 has a surface coverage ranging from 40% to 99%.

For example, in the present embodiment, the surface 101a of each ceramic particles 101 is not thoroughly encapsulated by the metal treating layer 102 (see FIG. 1D). The metal treating layer 102 disposed on each of the ceramic particles 101 has a surface coverage about 80%; the thickness of the metal treating layer 102 may be about 100 nm; and the sheet resistance of the metal treating layer 102 may be about $10^4$ Ω/S.

Figure 2:
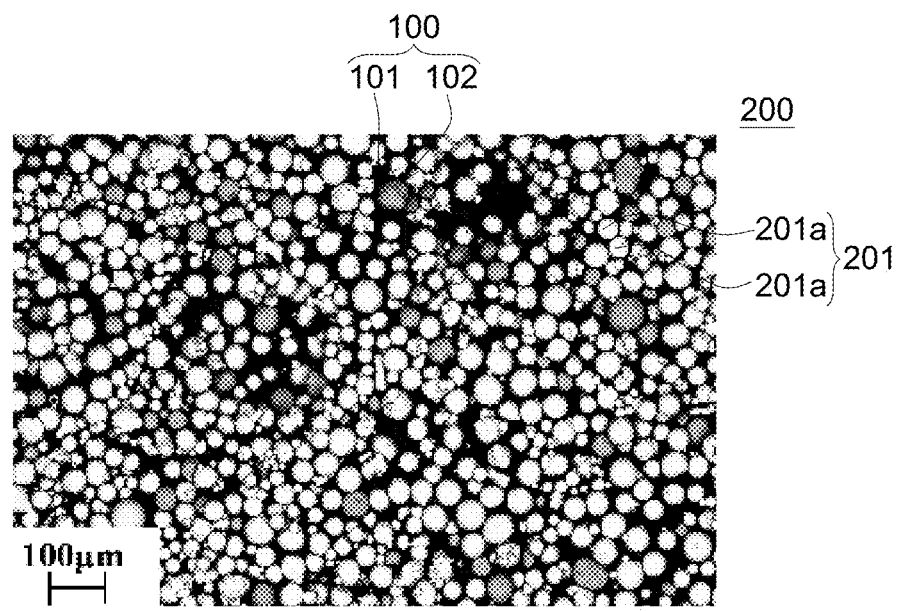
FIG. 2 is a SEM image illustrating a metal/ceramic composite powder according to one embodiment of the present disclosure.

Subsequently, the surface-treated ceramic particles 100 are mixed with a metal powder 201 having an average particle diameter ranging from 10 μm to 100 μm to form a metal/ceramic composite powder 200. FIG. 2 is a SEM image illustrating the metal/ceramic composite powder 200 according to one embodiment of the present disclosure.

In some embodiments of the present disclosure, the metal powder 201 may include a plurality of metal particles 201a made of a metal material selected from a group consisting of titanium (Ti), tatanlum (Ta), iron (Fe), magnesium (Mg) and the arbitrary combinations thereof. The metal/ceramic composite powder 200 includes about 1% to 10% of the surface-treated ceramic powder 100 and about 90% to 99% of the metal powder 201 by weight.

In the present embodiment, the metal/ceramic composite powder 200 is formed by uniformly mixing the surface-treated ceramic powder 100 with a titanium alloy powder (Ti-6Al-4V). The metal/ceramic composite powder 200 includes about 97% of the titanium alloy powder (Ti-6Al-4V) and 3% of the surface-treated ceramic powder 100 by weight. The surface-treated ceramic particles 100 have an average particle diameter about 1 μm; the titanium alloy powder (Ti-6Al-4V) has an average particle diameter about 100 μm; and the metal/ceramic composite powder 200 resulted from the uniformly mixing of the surface-treated ceramic powder 100 and the titanium alloy powder (Ti-6Al-4V) has a flow rates about 48 s/50 g.

A powder flowability test is then performed to comparing the flowabilities of the metal/ceramic composite powder 200 and the flowabilities of a composite powder including a ceramic powder that is not subjected to the surface-treatment (thereinafter referred to as the comparison embodiment). The test results can indicate that the flowability of the metal/ceramic composite powder 200 is much better than that of the comparison embodiment. It should be noted that the flow rate of the metal/ceramic composite powder 200 may vary depending upon the content of the surface-treated ceramic powder 100.

Figure 3:
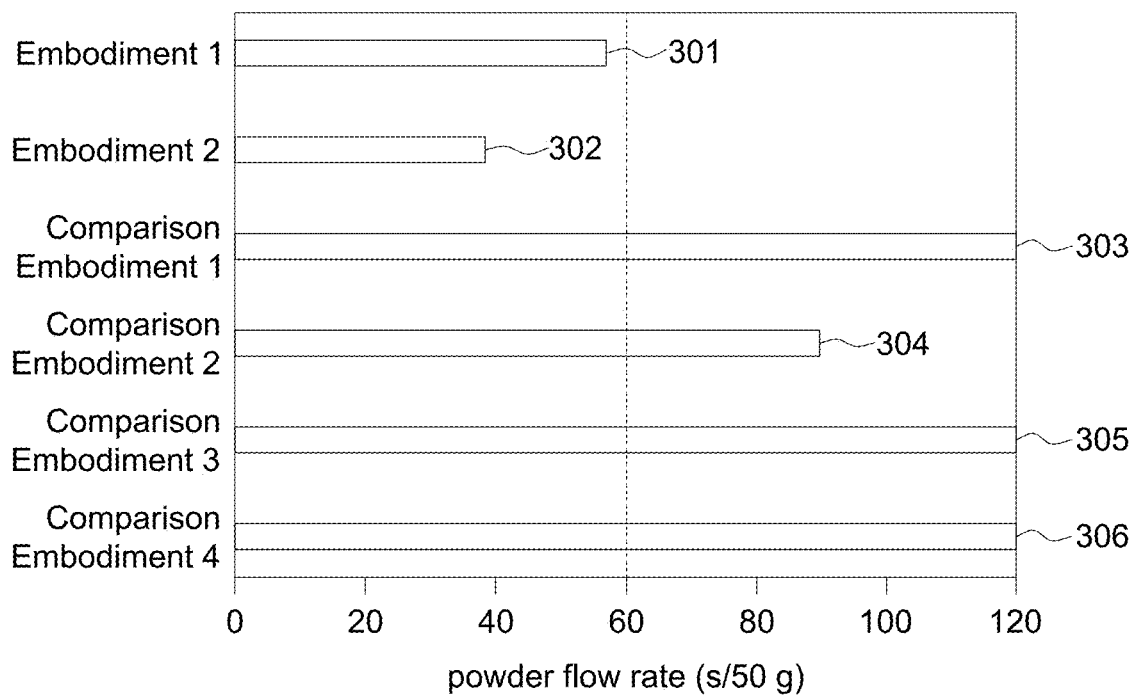
FIG. 3 is a histogram illustrating the powder flowability test results in comparing the flow rates of the metal/ceramic composite powder respectively provided by the embodiments of the present disclosure and the comparison embodiments.

FIG. 3 is a histogram illustrating the powder flowability test results in comparison the flow rates of the metal/ceramic composite powder 200 provided by the embodiment of the present disclosure and that of the comparison embodiment. The bar 301 represents the flow rate of the metal/ceramic composite powder 200 (embodiment 1) that includes about 95% of the titanium alloy powder (Ti-6Al-4V) and 5% of the surface-treated ceramic powder 100 by weight; the bar 302 represents the flow rate of the metal/ceramic composite powder 200 (embodiment 2) that includes about 99% of the titanium alloy powder (Ti-6Al-4V) and 1% of the surface-treated ceramic powder 100 by weight. The bar 303 represents the flow rate of the metal/ceramic composite powder (comparison embodiment 1) that includes about 95% of the titanium alloy powder (Ti-6Al-4V) and 5% of the non-treated ceramic powder by weight; the bar 304 represents the flow rate of the metal/ceramic composite powders (comparison embodiment 2) that includes about 99% of the titanium alloy powder (Ti-6Al-4V) and 1% of the non-treated ceramic powder by weight. The bar 305 represents the flow rate of the metal/ceramic composite powder (comparison embodiment 3) that includes about 90% of the titanium alloy powder (Ti-6Al-4V) and 5% of the non-treated ceramic powder by weight; the bar 306 represents the flow rate of the metal/ceramic composite powders (comparison embodiment 4) that includes about 98% of the titanium alloy powder (Ti-6Al-4V) and 1% of the non-treated ceramic powder by weight.

In accordance with the comparing results as depicted in FIG. 3, the metal/ceramic composite powders 200 provided by the embodiment 1 and the embodiment 2 of the present disclosure respectively have a flow rate about 57 s/50 g and 38.3 s/50 g; the flow rates of the metal/ceramic composite powders provided by the comparison embodiment 1 and the comparison embodiment 2 are both greater than 90 s/50 g; and the flow rates of the metal/ceramic composite powders provided by the comparison embodiment 3 and the comparison embodiment 4 are both greater than 120 s/50 g. The flow rates of the metal/ceramic composite powders provided by the comparison embodiments are far less than the flow rates (both less than 90 s/50 g) of the metal/ceramic composite powders 200 provided by the embodiments of the present disclosure. It can be indicated that the metal/ceramic composite powders 200 provided by the embodiments of the present disclosure have better flowabilities than that of the metal/ceramic composite powders provided by the comparison embodiments; and the metal/ceramic composite powders 200 provided by the embodiment 2 that includes 1% of the surface-treated ceramic powder 100 has a better flowability than that of the metal/ceramic composite powders 200 provided by the embodiment 1 that includes 5% of the surface-treated ceramic powder 100.

In addition, the flowability of the metal/ceramic composite powder 200 may vary depending upon the surface coverage of the metal treating layer 102 coated on each of the ceramic particles 101. In some embodiments of the present disclosure, when the metal treating layer 102 disposed on each of the ceramic particles 101 has a surface coverage about 80%, the metal/ceramic composite powders 200 formed by the surface-treated ceramic powder 100 has flow rate about 57 s/50 g that is much lower than that of the comparison embodiments. It can be indicated that the powder flowability of the metal/ceramic composite powder 200 can be improved significantly by the surface-treatment carried out on the ceramic particles prior to the mixing step for forming the metal/ceramic composite powder 200.

Figure 4A:
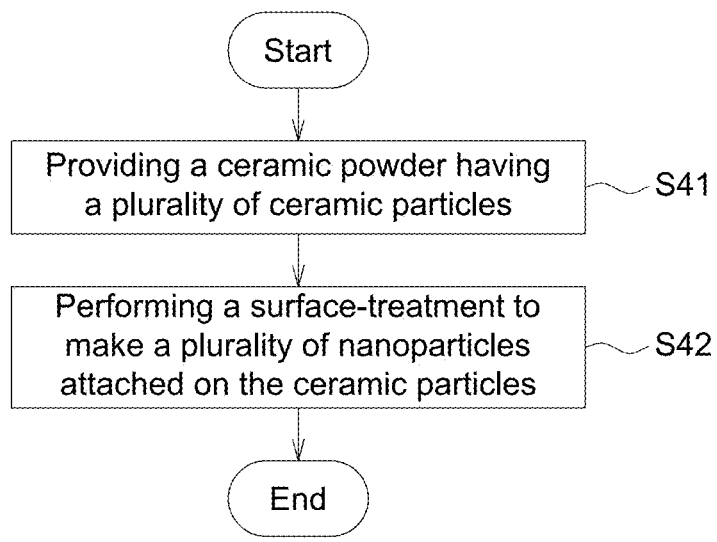
FIG. 4A is a process flow diagram illustrating the method for forming a surface-treated ceramic powder according to another embodiment of the present disclosure.
Figure 4B:
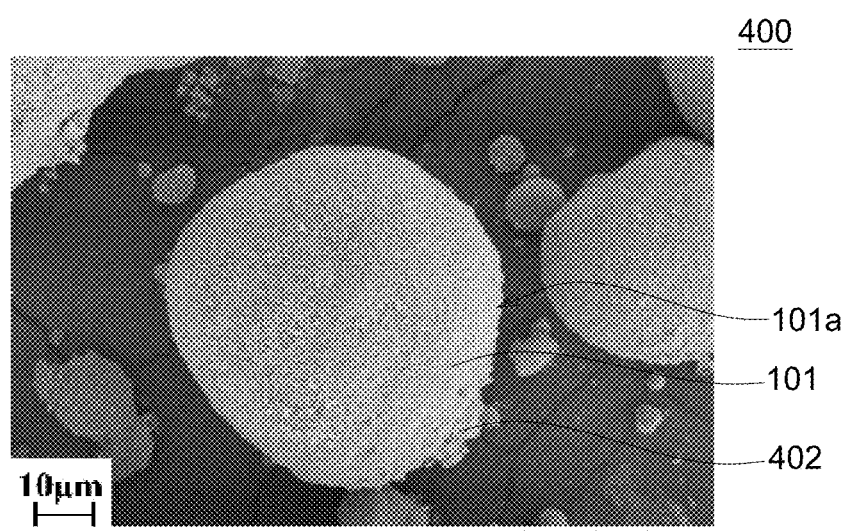
FIG. 4B is a SEM image illustrating a plurality of ceramic particles prepared by the step S41 of FIG. 4A.
Figure 4C:
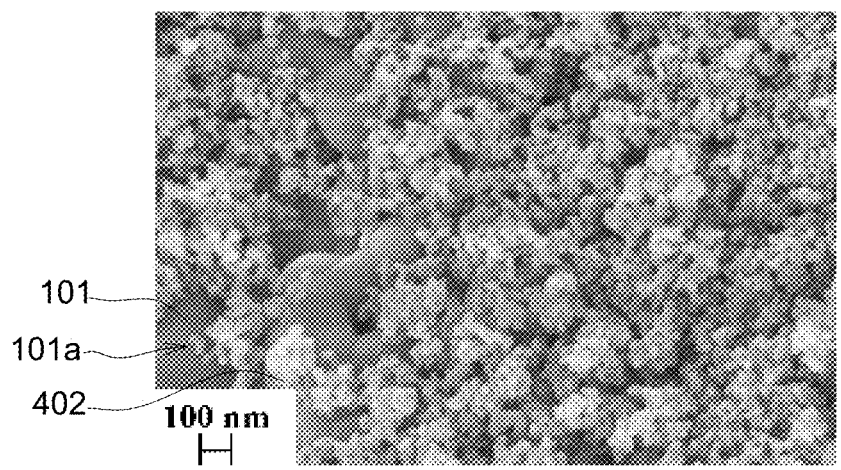
FIG. 4C is a partial enlarged view of the SEM image in FIG. 4B.

FIG. 4A is a process flow diagram illustrating the method for forming a surface-treated ceramic powder 400 according to another embodiment of the present disclosure. FIG. 4B is a SEM image illustrating a plurality of ceramic particles 401 prepared by the step S41 of FIG. 4A. FIG. 4C is a partial enlarged view of the SEM image depicted in FIG. 4B.

The method for forming the surface-treated ceramic powder 400 includes steps as follows: According to the step S41 of FIG. 4A, a plurality of ceramic particles 101 are firstly provided (see FIG. 1B). In some embodiments of present disclosure, the ceramic particles 101 may include a material, such as (but not limited to) HA, $Ca_3(PO_4)_2$, Si—Ca—Na—P—O, $TiO_2$, $ZrO_2$, $SiO_2$, $Al_2O_3$ or the arbitrary combinations thereof. The ceramic particles 101 have an average particle diameter ranging from 1 μm to 100 μm. In the present embodiment, the ceramic particles 101 can be made of HA and have an average particle diameter ranging from 20 μm to 60 μm.

Next, a surface-treatment is performed to make each of the ceramic particles 101 thoroughly encapsulated or partially coated by a surface-treating material, so as to form the ceramic particles 400 as shown in FIG. 4B. In the preset embodiment, the surface-treatment can be a nanoparticle attachment process to make a plurality of nanoparticles 402 attached on surfaces 101*a* of the ceramic particles 101. In some embodiments of the present disclosure, each of the ceramic particles 101 has a plurality of the nanoparticles 402 attached on the surface 101*a* thereof. In some other embodiments, merely a portion of the ceramic particles 101 have the nanoparticles 402 attached on the surface 101*a* thereof; other portion of the ceramic particles 101 do not have any nanoparticles attached on the surface 101*a* thereof.

In some embodiments of the present disclosure, the nanoparticles 402 may include a metal oxide, such as (but not limited to) $TiO_2$, $ZrO_2$, $SiO_2$, $Al_2O_3$ or the arbitrary combinations thereof. The nanoparticles 402 may have an average particle diameter ranging from 10 nm to 100 nm. Each of the ceramic particles 101 can be thoroughly covered by the attached nanoparticles 402; or the surface 101*a* of each ceramic particles 101 may be just partially covered by the attached nanoparticles 402. In some embodiments, the weight ratio of the nanoparticles 402 to the ceramic particles 101 may range from 1% to 50%. In the one embodiment, the weight ratio of the nanoparticles 402 to the ceramic particles 101 may range from 1/10 to 5/10.

In the present embodiment, the attached nanoparticles 402 partially cover the surface 101*a* of each ceramic particles 101 (as shown in FIG. 4C), and the nanoparticles 402 attached on each of the ceramic particles 101 has a surface coverage ranging from 40% to 99%. The weight ratio of the nanoparticles 402 to the ceramic particles 101 can be about 3/10.

Figure 5:
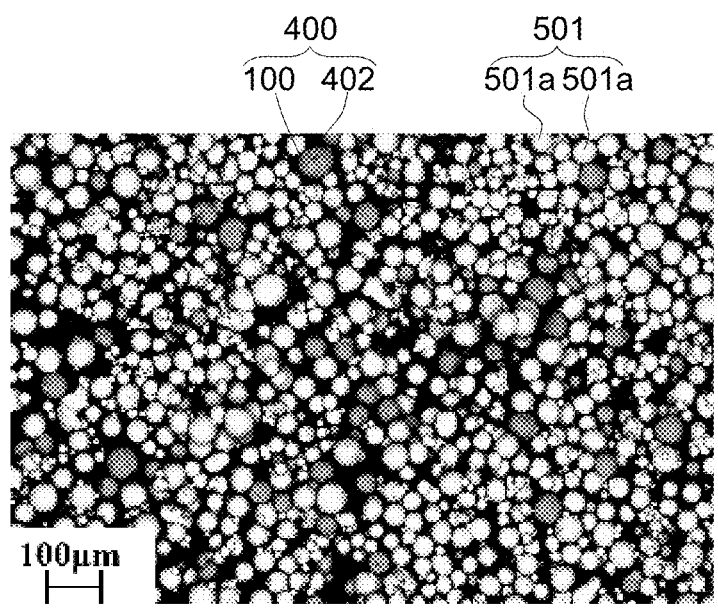
FIG. 5 is a SEM image illustrating the metal/ceramic composite powder 500 according to one embodiment of the present disclosure.

Subsequently, the surface-treated ceramic particles 400 are mixed with a metal powder 501 having an average particle diameter ranging from 10 μm to 100 μm to form a metal/ceramic composite powder 500. FIG. 5 is a SEM image illustrating the metal/ceramic composite powder 500 according to one embodiment of the present disclosure.

In some embodiments of the present disclosure, the metal powder 501 may include a plurality of metal particles 501a made of a metal material selected from a group consisting of Ti, Ta, Fe, Mg and the arbitrary combinations thereof. The metal/ceramic composite powder 200 includes about 1% to 10% of the surface-treated ceramic powder 400 and about 90% to 99% of the metal powder 501 by weight.

In the present embodiment, the metal/ceramic composite powder 500 is formed by uniformly mixing the surface-treated ceramic powder 400 with a titanium alloy powder (Ti-6Al-4V). The metal/ceramic composite powder 500 includes about 97% of the titanium alloy powder (Ti-6Al-4V) and 3% of the surface-treated ceramic powder 400 by weight.

A powder flowability test is then performed to comparing the flowabilities of the metal/ceramic composite powder 500 and the flowabilities of a composite powder including a ceramic powder that is not subjected to the surface-treatment (thereinafter referred to as the comparison embodiment). The test results can indicate that the flowability of the metal/ceramic composite powder 500 is much better than that of the comparison embodiment. It should be noted that the flowability of the metal/ceramic composite powder 500 may vary depending upon the content of the surface-treated ceramic powder 400.

Figure 6:
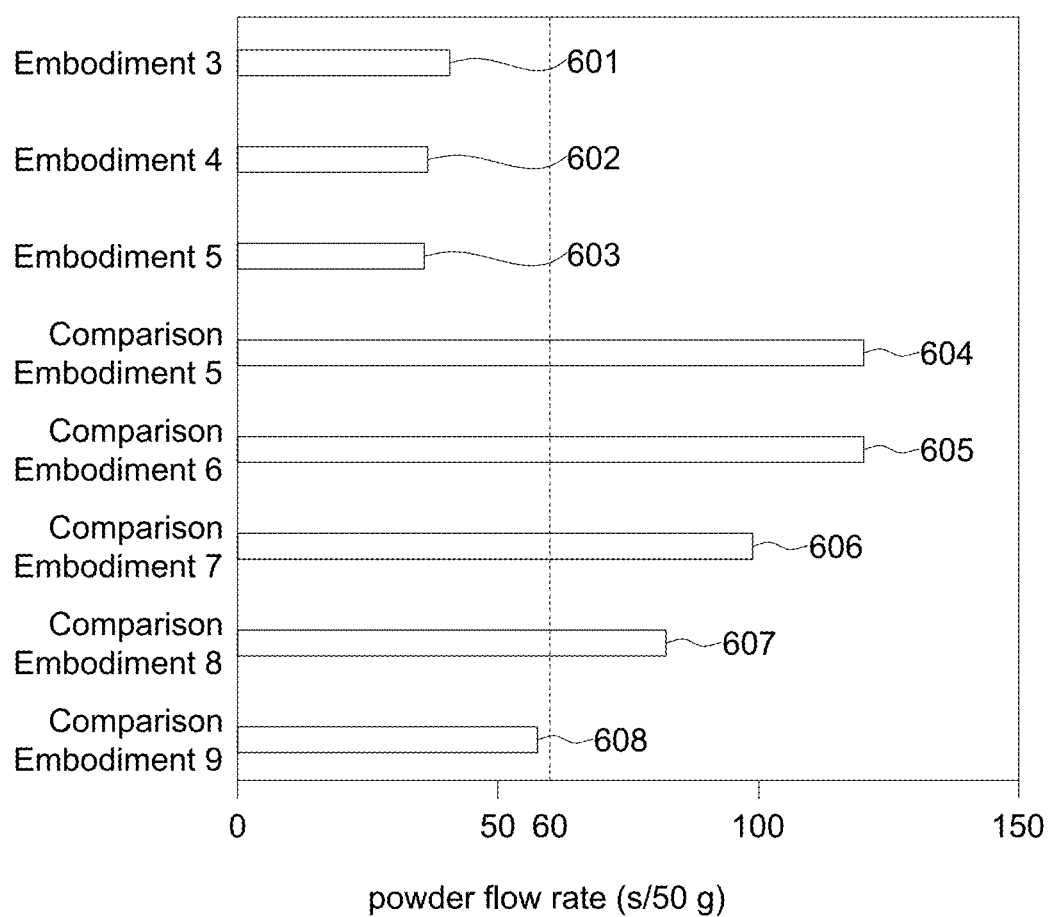
FIG. 6 is a histogram illustrating the powder flowability test results in comparing the flow rates of the metal/ceramic composite powder respectively provided by the embodiments of the present disclosure and the comparison embodiments.

FIG. 6 is a histogram illustrating the powder flowability test results in comparison the flow rates of the metal/ceramic composite powder 500 provided by the embodiment of the present disclosure and that of the comparison embodiment. The bar 601 represents the flow rate of the metal/ceramic composite powder 500 (embodiment 3) that includes about 95% of the titanium alloy powder (Ti-6Al-4V) and 5% of the surface-treated ceramic powder 400 by weight; the bar 602 represents the flow rate of the metal/ceramic composite powder 500 (embodiment 4) that includes about 97% of the titanium alloy powder (Ti-6Al-4V) and 3% of the surface-treated ceramic powder 400 by weight; and the bar 603 represents the flow rate of the metal/ceramic composite powder 500 (embodiment 5) that includes about 99% of the titanium alloy powder (Ti-6Al-4V) and 1% of the surface-treated ceramic powder 400 by weigh. The bar 604 represents the flow rate of the metal/ceramic composite powder (comparison embodiment 5) that includes about 95% of the titanium alloy powder (Ti-6Al-4V) and 5% of the non-treated ceramic powder by weight; the bar 605 represents the flow rate of the metal/ceramic composite powders (comparison embodiment 6) that includes about 97% of the titanium alloy powder (Ti-6Al-4V) and 3% of the non-treated ceramic powder by weight; and the bar 606 represents the flow rate of the metal/ceramic composite powders (comparison embodiment 7) that includes about 99% of the titanium alloy powder (Ti-6Al-4V) and 1% of the non-treated ceramic powder by weight. The bar 607 represents the flow rate of the metal/ceramic composite powder (comparison embodiment 8) that is prepared by steps of mixing about 95% of the titanium alloy powder (Ti-6Al-4V), 5% of the non-treated ceramic powder and the nanoparticles 402 at the same time without performing the aforementioned surface-treatment; the bar 608 represents the flow rate of the metal/ceramic composite powders (comparison embodiment 9) that is prepared by steps of mixing about 99% of the titanium alloy powder (Ti-6Al-4V), 1% of the non-treated ceramic powder and the nanoparticles 402 at the same time without performing the aforementioned surface-treatment.

In accordance with the comparing results as depicted in FIG. 6, the metal/ceramic composite powders 500 provided by the embodiment 3, the embodiment 4 and the embodiment 5 of the present disclosure respectively have a flow rate about 40.58 s/50 g, 36.32 s/50 g and 35.66 s/50 g. The flow rates of the metal/ceramic composite powders provided by the comparison embodiment 5, the comparison embodiment 6 and the comparison embodiment 7 are greater than 90 s/50 g. The metal/ceramic composite powders provided by the comparison embodiment 8 and the comparison embodiment 9 respectively have a flow rate about 75.2 s/50 g and 57.2 s/50 g. The flow rates of the metal/ceramic composite powders provided by the comparison embodiment 5, the comparison embodiment 6 and the comparison embodiment 7 are far more than that of the metal/ceramic composite powders 500 provided by the embodiment 3, the embodiment 4 and the embodiment 5. The flow rates of the metal/ceramic composite powders provided by the comparison embodiment 8 and the comparison embodiment 9 are still greater than that of the metal/ceramic composite powders 500 provided by the embodiment 3, the embodiment 4 and the embodiment 5, nevertheless less than that of the metal/ceramic composite powders provided by the comparison embodiment 5, the comparison embodiment 6 and the comparison embodiment 7 that do not include any nanoparticles 402.

It can be indicated that the metal/ceramic composite powders 500 provided by the embodiments of the present disclosure have better flowabilities than that of the metal/ceramic composite powders provided by the comparison embodiments. The metal/ceramic composite powders (e.g. the metal/ceramic composite powders provided by the comparison embodiments 8 and 9) that are not subjected to the surface-treatment may not get flowabilities better than that of the metal/ceramic composite powders 500 provided by the embodiments of the present disclosure, even if the non-treated metal/ceramic composite powders include the same content of the non-treated ceramic powder, the metal powder 501 and the nanoparticles 402. The metal/ceramic composite powders 500 provided by the embodiment 5 that includes 1% of the surface-treated ceramic powder 400 has a better flowability than that of the metal/ceramic composite powders 500 provided by the embodiment 3 and the embodiment 4 that respectively includes 5% and 3% of the surface-treated ceramic powder 400.

Similarly, the flowability of the metal/ceramic composite powder 500 may vary depending upon the surface coverage of the nanoparticles 402 attached on each of the ceramic particles 101. In some embodiments of the present disclosure, when the nanoparticles 402 attached on each of the ceramic particles 101 has a surface coverage about 40%, the metal/ceramic composite powders 500 formed by the surface-treated ceramic powder 400 has flow rate about 45 s/50 g; and when the nanoparticles 402 attached on each of the ceramic particles 101 has a surface coverage about 99%, the metal/ceramic composite powders 500 formed by the surface-treated ceramic powder 400 has flow rate about 35 s/50 g that is much lower than that of the comparison embodiments. It can be indicated that the powder flowability of the metal/ceramic composite powder 500 can be improved significantly by the surface-treatment carried out on the ceramic particles 101 prior to the mixing step for forming the metal/ceramic composite powder 500.

In accordance with the embodiments of the present disclosure, a surface-treated ceramic powder, a metal/ceramic composite powder including the surface-treated ceramic powder and the method for fabricating the same are provided. A plurality ceramic particles are subjected to a surface-treatment to form the surface-treated ceramic powder, by which a surface-treating material made of metal, metal oxide or the combination thereof is at least partially coated on each of the ceramic particles. The surface-treated ceramic powder is then mixed with a plurality of metal particles to form the metal/ceramic composite powder, whereby the flowability of the metal/ceramic composite powder can be improved.

In some embodiments of the present disclosure, the metal/ceramic composite powder including the surface-treated ceramic powder may have a flow rate ranging from 30 s/50 g to 60 s/50 g and can be uniformly swept and distributed over a platform on which a laser sintering process is performed during a build cycle of the MA.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A metal/ceramic composite powder, comprising:
   a surface-treated ceramic powder, having a concentration ranging from 1% to 10% by weight of the metal/ceramic composite powder, and comprising:
   a plurality of ceramic particles, having an average particle diameter ranging from 1 micrometer (μm) to 100 μm, wherein each of the ceramic particles comprises a ceramic material selected from the group consisting of hydroxyapatite (HA), calcium phosphate ($Ca_3(PO_4)_2$), bioactive glass (Si—Ca—Na—P—O), titanium oxide ($TiO_2$), silicon dioxide ($SiO_2$) and combinations thereof;
   a plurality of nanoparticles having an average particle diameter ranging from 10 (nanometer) nm to 100 nm attached on at least one of the ceramic particles; and
   a metal or metal oxide treating layer, at least partially coating on a surface of each of the ceramic particles with a surface coverage ranging from 40% to 99% and having a sheet resistance ranging from $10^4$ ohms per square (Ω/S) to $10^{11}$ Ω/S; and
   a plurality of metal particles, having a concentration ranging from 90% to 99% of by weight of the metal/ceramic composite powder and an average particle diameter ranging from 10 μm to 100 μm.

2. The metal/ceramic composite powder according to claim 1, wherein the metal or metal oxide treating layer comprises a metal material selected from the group consisting of iron (Fe), cobalt (Co), titanium (Ti), tantalum (Ta), palladium (Pd), silver (Ag), gold (Au) and combinations thereof.

3. The metal/ceramic composite powder according to claim 1, wherein the metal or metal oxide treating layer has a thickness ranging from 10 nanometer (nm) to 100 nm.

4. The metal/ceramic composite powder according to claim 1, wherein the nanoparticles comprise a metal oxide selected from the group consisting of titanium oxide ($TiO_2$), zirconium oxide ($ZrO_2$), aluminum oxide ($Al_2O_3$) and combinations thereof.

5. The metal/ceramic composite powder according to claim 1, wherein a weight ratio of the nanoparticles to the ceramic particles ranges from 1% to 50%.

6. The metal/ceramic composite powder according to claim 1, wherein the metal particles comprise a metal material selected from the group consisting of Ti, Ta, Fe, magnesium (Mg) and combinations thereof.

7. The metal/ceramic composite powder according to claim 1, wherein the metal/ceramic composite powder has a powder flow rate ranging from 30 second (s)/50 gram (g) to 60 s/50 g.

* * * * *